United States Patent [19]

Matsuda

[11] Patent Number: 4,769,566
[45] Date of Patent: Sep. 6, 1988

[54] SHALLOW CUP-SHAPED MINIATURE MOTOR

[75] Inventor: Shinichi Matsuda, Matsudi, Japan

[73] Assignee: Mabuchi Motor Co. Ltd., Japan

[21] Appl. No.: 37,696

[22] Filed: Apr. 13, 1987

[30] Foreign Application Priority Data

Apr. 15, 1986 [JP] Japan .................... 61-56568

[51] Int. Cl.⁴ ............................. H02K 37/00
[52] U.S. Cl. ............................. 310/40 MM; 310/233; 310/237; 310/239
[58] Field of Search ......... 310/40 MM, 269, 233–237, 310/248–253, 239, 219, 220–225

[56] References Cited

U.S. PATENT DOCUMENTS

| | | | |
|---|---|---|---|
| 1,464,184 | 8/1923 | Mansbendel | 310/235 X |
| 2,453,101 | 11/1948 | Schulz | 310/40 MM |
| 2,756,354 | 7/1956 | Baron | 310/235 X |
| 3,488,538 | 1/1970 | Hayashi | 310/220 |
| 3,532,913 | 10/1970 | Förste et al. | 310/236 X |
| 3,594,598 | 7/1971 | Schaub | 310/220 |
| 3,617,785 | 11/1971 | Kristiansen | 310/236 |
| 4,086,510 | 4/1978 | Watanabe | 310/248 X |
| 4,322,650 | 3/1982 | Mabuchi | 310/220 |

Primary Examiner—Mark O. Budd
Attorney, Agent, or Firm—McGlew and Tuttle

[57] ABSTRACT

A shallow cup-shaped miniature motor having a motor case of a substantially shallow cup shape, fitted with a permanent magnet field; a motor case cover engaged with the open end face of the motor case; a rotor having a motor rotating shaft rotatably supported by a first bearing provided on the closed end face of the motor case and a second bearing provided on the motor case cover; brushes supported by the motor case cover for making sliding contact with commutator segments provided on the motor rotating shaft, in which an insulating core having wing portions substantially covering a laminated core comprising the rotor is provided on the outermost end face of the laminated core; the insulating core having at the center thereof a through hole through which the motor rotating shaft is passed, and a hollow cylindrical portion, provided around the through hole, having a plurality of notches for engaging with a plurality of the rising portions of the commutator segments; a commutator surface comprising the commutator segments is formed on the motor rotating shaft on the inside surface of the hollow cylindrical portion, rotor windings are wound on the laminated core covered with the wing portions of the insulating core while being supported by the outer circumferential surface of the hollow cylindrical portion of the insulating core, and the brushes make sliding contact with the commutator surface formed on the inside surface of the hollow cylindrical portion of the insulating core.

6 Claims, 3 Drawing Sheets

SHALLOW CUP-SHAPED MINIATURE MOTOR

BACKGROUND OF THE INVENTION

This invention relates generally to a shallow cup-shaped miniature motor, and more particularly to a shallow cup-shaped miniature motor in which the commutator is provided in such a manner that the commutator surface is recessed toward the rotor in the axial direction of the motor so as to reduce the length of the motor in the axial direction. The term "shallow cup-shaped miniature motor" as used in this invention means a miniature motor in which the axial length of the motor body is smaller than the diameter of the motor.

DESCRIPTION OF THE PRIOR ART

A shallow cup-shaped miniature motor in which the axial length thereof is smaller than the diameter thereof has heretofore been known. This type of miniature motor has such a construction as shown in FIG. 8, for example.

In FIG. 8, reference numeral 1 refers to a motor case; 2 to a motor case cover; 3 to a permanent magnet; 4 to a first bearing; 5 to a second bearing; 6 to a laminated core comprising a rotor; 7 to a rotor winding; 8 to a brush; 9 to a commutator surface; 10 and 11 to motor terminals; 12 to a motor rotating shaft; 13 and 14 to insulating cores, respectively.

On the laminated end face of the laminated core of a rotor 6 is disposed having the insulating cores 13 and 14 each made of an insulating material. The rotor winding 7 is wound on the laminated core 6, which is sandwiched by the insulating cores 13 and 14, in such a manner that the rotor winding 7 covers a substantial part of the insulating cores 13 and 14. In other words, the insulating cores 13 and 14 play a role to insulate the rotor winding 7 from the laminated core 6.

The commutator surface 9 is provided on the motor rotating shaft 12-12. Brush 8, supported by the motor case cover 2, makes sliding contact with the commutator surface 9. Needless to say, the rotor is caused to rotate in a magnetic field produced by the permanent magnet 3 to deliver power to the motor rotating shaft 12.

With the above-mentioned construction of the conventional type of shallow cup-shaped miniature motor, there exists a gap L between the position at which the rotor winding 7 exists and the position at which the commutator surface 9 exists, as is apparent from FIG. 8. The gap L is provided to prevent the overlapping of the position at which the rotor winding 7 is wound on the core with the position at which the commutator surface 9 exists. Consequently, the axial length of the conventional type of miniature motor cannot be reduced satisfactorily due to the presence of the gap L.

SUMMARY OF THE INVENTION

This invention is intended to overcome the aforementioned problems.

It is a first object of thes invention to provide a shallow cup-shaped miniature motor wherein an insulating core having wing portions which substantially cover a laminated core comprising a rotor is provided on the outermost end faces of the laminated core; the insulating core having a hollow cylindrical portion; a commutator surface comprising commutator segments is formed on a motor rotating shaft on the inside surface of the hollow cylindrical portion; and the hollow cylindrical portion forms a barrier to prevent the rotor winding from unwantedly interfering with the commutator surface. It is a second object of this invention to provide a shallow cup-shaped miniature motor wherein the hollow cylindrical portion is raised at right angles from the end face of the laminated core so as to form a recess along the motor rotating shaft; the commutator segments comprising the commutator surface are disposed in the recess at a predetermined angular positional spacing; the rising portions of the commutator segments are formed so as to engage with the notches formed on the hollow cylindrical portion; and the rising portions of the commutator segments are drawn out in the radial direction from the motor rotating shaft while being forced onto the insulating core.

It is a third object of this invention to provide a shallow cup-shaped miniature motor wherein a spark-quenching varistor ring is disposed concentrically, together with a washer, in the hollow cylindrical portion and electrically connected to the rising portions of the commutator segments.

It is a fourth object of this invention to provede a shallow cup-shaped miniature motor wherein the brush is formed in a shape of; and the substantially h-shaped brush terminal portions of the brushes are fixedly fitted to the motor case cover by embedding the two legs thereof in the motor case cover, and electrically connected to the motor terminals.

It is a fifth object of this invention to provide a shallow cup-shaped miniature motor wherein the sliding pieces of the brushes are made of a beryllium-copper alloy as the base material, with a palladium alloy layer applied to the surface of the sliding piece, and preferably with a solder plating layer applied on the opposite surface thereof to form a joint portion to connect to the terminal portion.

These and other objects of this invention will become apparent from the following description taken in connection with the accompanying drawings.

DETAILED DESCRIPTION OF THE EMBODIMENT

Figure 1:
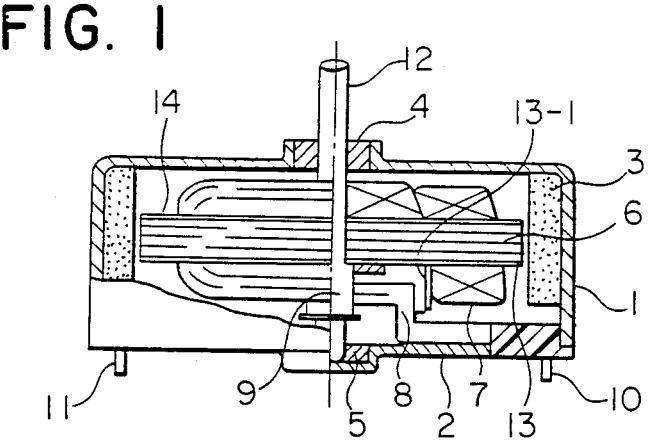
FIG. 1 is a diagram illustrating a miniature motor embodying this invention.

In FIGS. 1 through 8, reference numeral 1 refers to a motor case; 2 to a motor case cover; 3 to a permanent magnet; 4 and 5 to bearings; 6 to a laminated core; 7 to a rotor winding; 8 to a brush; 9 to a commutator surface; 10 and 11 to motor terminals; 12 to a motor rotating shaft; 13 and 14 to insulating cores; 13-1 to a hollow cylindrical portion; 13-2 to a through hole; 13-3 to a wing portion; 13-4 to a stem portion; 13-5 to a notch; 15-1 to a commutator segment; 15-2 to a rising portion;

16 to a spark-quenching varistor ring; 17 to a washer, respectively.

Figure 8:
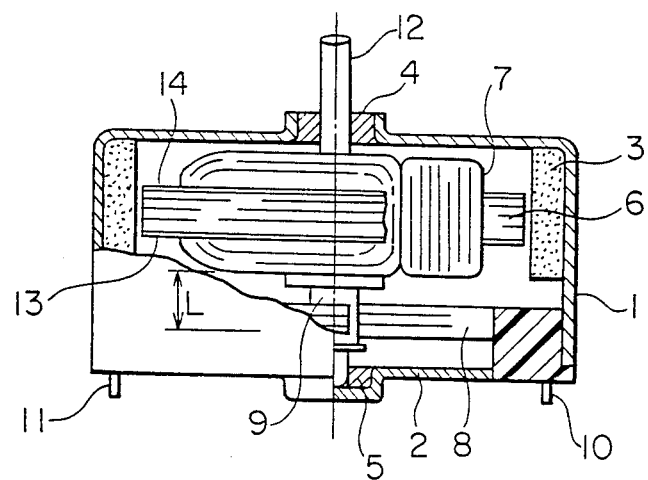
FIG. 8 shows a conventional type of shallow cup-shaped miniature motor.

The basic construction and operation of the entire motor assembly is much the same as those of the conventional type of shallow cup-shaped miniature motor shown in FIG. 8, except that an insulating core 13 of this invention has a hollow cylindrical portion 13-1 inside which a commutator surface 9 is disposed, and that the hollow cylindrical portion 13-1 forms a barrier to prevent a rotor winding 7 from unwantedly interfering with the commutator surface 9, as will be described in detail later, referring to FIG. 2.

By adopting the construction shown in FIG. 1, the rotor winding 7 is wound around the laminated core 6 while resting on the hollow cylindrical portion 13-1. This permits the commutator surface 9 to be located at a position closer to the laminated core 6 than with the conventional type of motor shown in FIG. 8. That is, this construction eliminates the need for providing the aforementioned gap L, compared with the motor shown in FIG. 8. In other words, this construction makes it possible to reduce the axial length of the motor. Adoption of this construction of course presents a new problem as to how the brushes 8 fitted to the motor case cover 2 make sliding contact with the commutator surface 9 which is located at an inwardly recessed position with respect to the hollow cylindrical portion 13-1, as described above. This, however, can be solved by employing a brush formed into a shape, as shown in FIG. 1.

Figure 2:
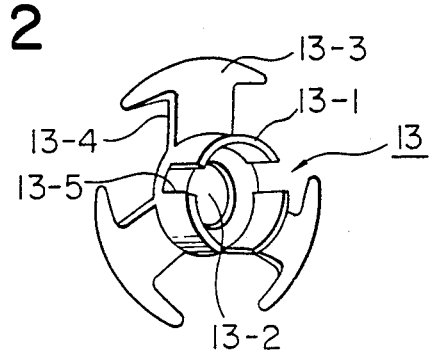
FIG. 2 is a diagram illustrating an insulating core usable in this invention.
Figure 3:
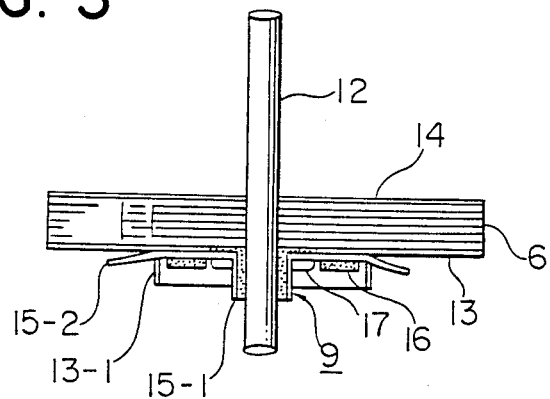
FIGS. 3 and 4 are diagrams of assistance in explaining the construction of the rotor assembly before the rotor windings are wound.

The insulating core 13 shown in FIG. 2 is disposed in such a manner as to cover one end face of the laminated core 6, as shown in FIG. 3. Since the insulating core 14, which covers the other end face of the laminated core 6, is the same as that used in the conventional type of miniature motor shown in FIG. 8, description thereof is omitted here.

When the insulating core 13 is disposed on the laminated core 6 as shown in FIG. 3, the motor rotating shaft 12 is passed through the through hole 13-2 located at the center of the insulating core 13, with the consequence that the hollow cylindrical portion 13-1 is positioned as if the portion stands at right angles from the laminated core 6, and that a recess is formed along the motor rotating shaft 12.

In the recess thus formed, provided are commutator segments 15-1 of a known type at an angular positional spacing of 120°, for example. As is apparent from FIG. 4, the rising portion or commutator for extending members 15-2 of the commutator segment 15-1 is caused to engage with the notch 13-5 of the hollow cylindrical portion 13-1 and drawn out in the radial direction from the motor rotating shaft 12. The rising portion 15-2 of the commutator segment 15-1 is forced onto the insulating core 13 by a washer 17.

Figure 4:
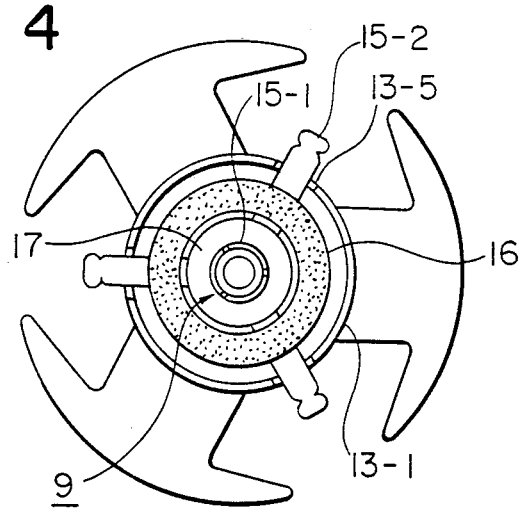

In the embodiment shown in FIGS. 3 and 4, a spark-quenching varistor ring 16 of a known type is disposed concentrically, together with the washer 17, in the hollow cylindrical portion 13-1 and electrically connected to the rising part 15-2.

Figure 5:
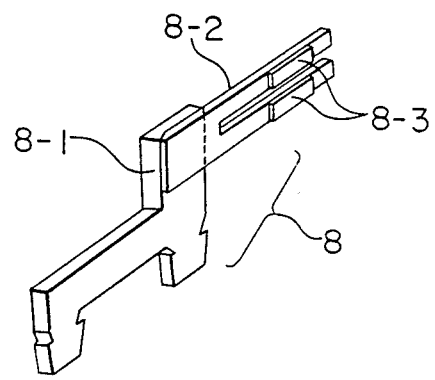
FIGS. 5 and 6 are diagrams of assistance in explaining a brush usable in this invention.
Figure 6:
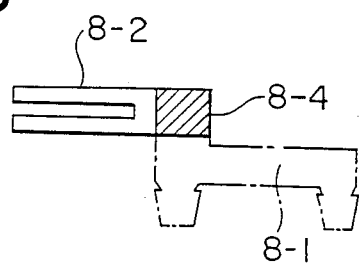

As shown in FIG. 1, the brush 8 is formed in a particular shape. FIGS. 5 and 6 show an example of brush usable in this invention. In the figures, numeral 8 refers to a brush; 8-1 to a terminal portion; 8-2 to a brush sliding piece; 8-3 to a sliding contact; and 8-4 to a joint portion, respectively. The substantially h-shaped terminal portion 8-1 is fixedly fitted to the motor case cover 2 by embedding the two legs thereof in the motor case cover 2, and electrically connected to the motor terminals 10 and 11.

Figure 7:
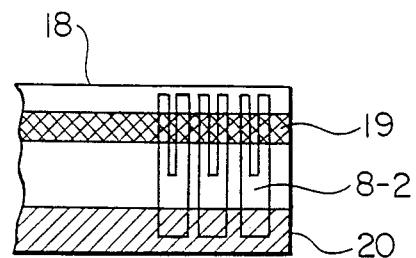
FIG. 7 is a diagram of assistance in explaining the method of manufacturing brushes.

The brush sliding piece 8-2 is constructed by using a beryllium-copper alloy as the base material. FIG. 7 shows the method of constructing the brush sliding piece 8-2 using the beryllium-copper alloy. In the figure, numeral 18 indicates a base material; 19 a palladium alloy layer formed on the base material 18; 20 a solder plating layer, respectively. The solder plating layer 20 should preferably be formed on the opposite surface (rear surface) to the surface to which the palladium alloy layer 19 was applied. The brush sliding piece 8-2 is produced by blanking the base material 18, as shown in FIG. 7. The brush sliding piece 8-2 thus produced is joined with the terminal portion 8-1 at the joint portion 8-4 which preferably corresponds with the solder plating layer 20, as shown in FIG. 6.

As described above, this invention makes it possible to prevent the unwanted overlapping of the position at which the rotor winding exists with the position at which the commutator surface exists by disposing the commutator surface in a recess formed by the hollow cylindrical portion of the insulating core, whereby allowing the axial length of the motor to be reduced.

What is claimed is:

1. A miniature motor comprising a cup shaped housing with a motor case cover, one of said cup shaped housing and said motor case cover having an opening; a permanent magnet fixed in said cupped shaped housing; first and second bearing members connected to said cup shaped housing and said motor case respectively, one of said bearing members being positioned in said opening; a motor shaft mounted in said first and second bearings for rotation with respect to said cup shaped housing, said motor shaft extending through said opening; a rotor fixedly mounted on said motor shaft for rotation therewith, said rotor having a laminated portion forming a laminated core with an outer most end face; an insulating core member having an insulating core surface with a through hole, said motor shaft passing through said through hole, said insulated core member having wing portions, each wing portion adapted to abut said outermost end face of said laminated portion, said insulating core having a cylindrical portion, defining a cylindrical space, said cylindrical portion having walls substantially perpendicular to said insulating core surface extending away from said laminated core, said walls having notch portions passing through said walls providing communication between exterior of said cylindrical space and interior of said cylindrical space; commutator segments positioned about said motor shaft to form a commutator surface, said commutator segments being positioned in said cylindrical space of said cylindrical portion connected to commutator extending members, said commutator extending members each extending through corresponding notch portions of said cylindrical portion; a brush member having a portion extending into said cylindrical space of said cylindrical portion for contact with said commutator surface; and, rotor windings wound on said laminated core and wound on said insulating core member wing portions abutting said laminated core, said rotor windings being supported by said cylindrical portion exterior of said cylindrical space.

2. A miniature motor according to claim 1, wherein: said brush member being of substantially H-shape having a terminal portion fixedly fitted to said motor case, said terminal portion having leg members embedded in said motor case cover electrically connected to a motor terminal.

3. A miniature motor according to claim 1, wherein: said brush portion includes a sliding piece adapted to contact said commutator surface, said sliding piece being formed of a beryllium-copper alloy for a base material, with a palladium alloy formed on a pre-determined portion of the surface of said base material.

4. A miniature motor according to claim 1, wherein: said brush member includes a sliding piece engaging said commutator surface within said cylindrical portion, a joint portion connected to said sliding piece, said joint portion extending outside of said cylindrical portion and, a terminal portion connected to said joint portion extending substantially parallel to said motor case cover, said terminal portion being adapted to the electrically connected to a motor terminal.

5. A miniature motor according to claim 4, wherein: said sliding portion includes a sliding piece in contact with said commutator surface, said sliding piece being in sheet form having a base material of beryllium-copper alloy with a palladium alloy layer formed on said base material.

6. A miniature motor comprising a cup shaped housing with a motor case cover, one of said cup shaped housing and said motor case cover having an opening; a permanent magnet fixed in said cupped shaped housing; first and second bearing members connected to said cup shaped housing and said motor case respectively, one of said bearing members being positioned in said opening; a motor shaft mounted in said first and second bearings for rotation with respect to said cup shaped housing, said motor shaft extending through said opening; a rotor fixedly mounted on said motor shaft for rotation therewith, said rotor having a laminated portion forming a laminated core with an outer most end face; an insulating core member having an insulating core surface with a through hole, said motor shaft passing through said through hole, said insulated core member having wing portions, each wing portion adapted to abut said outermost end face of said laminated portion, said insulating core having a cylindrical portion, defining a cylindrical space, said cylindrical portion having walls substantially perpendicular to said insulating core surface extending away from said laminated core, said walls having notch portions passing through said walls providing communication between exterior of said cylindrical space and interior of said cylindrical space; commutator segments positioned about said motor shaft to form a commutator surface, said commutator segments being positioned in said cylindrical space of said cylindrical portion connected to commutator extending members, said commutator extending members each extending through corresponding notch portions of said cylindrical portion; a brush member having a portion extending into said cylindrical space of said cylindrical portion with a sliding piece for contact with said commutator surface, a joint portion connected to said sliding piece, said joint portion extending outside of said cylindrical portion and, a terminal portion connected to said joint portion extending substantially parallel to said motor case cover; and, rotor windings wound on said laminated core and wound on said insulating core member wing portions abutting said laminated core, said rotor windings being supported by said cylindrical portion exterior of said cylindrical space.

* * * * *